March 22, 1932.    C. L. EKSERGIAN    1,850,345

BRAKE DRUM ATTACHMENT FOR ARTILLERY WHEELS

Filed May 29, 1930

*INVENTOR.*
CAROLUS L. EKSERGIAN.
BY
*ATTORNEY.*

Patented Mar. 22, 1932

1,850,345

UNITED STATES PATENT OFFICE

CAROLUS L. EKSERGIAN, OF DETROIT, MICHIGAN, ASSIGNOR TO BUDD WHEEL COMPANY, OF PHILADELPHIA, PENNSYLVANIA, A CORPORATION OF PENNSYLVANIA

BRAKE DRUM ATTACHMENT FOR ARTILLERY WHEELS

Application filed May 29, 1930. Serial No. 457,096.

The outstanding object of my invention consists in providing a seat for a brake drum on the spokes of an artillery steel wheel, and the means of securing the drum rigidly to the wheel. Coincident with the securing means, improved conditions are afforded for assembling the respective parts of the wheel.

Another salient object of my invention is to utilize a brake drum constructed from rolled strip stock, thereby effecting a saving in weight and material, by virtue of the relatively short inward flange which may be used in this construction. More specifically, it is proposed to provide an annular series of axially extending studs integrally mounted within the spokes to engage the inward flange of the brake drum through corresponding equally spaced holes.

A further provision is made to detachably mount the drum on said studs by securing the stud ends by removable nuts. Furthermore, it is proposed to attach the drum to the spokes by partially concealed studs, hidden within said spokes, and completely concealed from view, from the outside of the wheel. This concealment within the spoke has been accomplished without distorting or disfiguring the outer surface thereof.

In the artillery wheel art, the practice of forming wheels of steel stampings has been previously known. It has been a further practice to form these steel stampings in sections in an effort to simplify the stamping operation and to provide a simple and inexpensive wheel body. These sections are made in symmetrical relationship to each other, and when the related parts are joined, preferably by welding, a complete artillery wheel spider is formed, with the weld line approximately in the plane of rotation of the spokes. It is this particular type of wheel to which my invention is especially applicable. The invention comprises generally a brake drum of relatively simple design, detachably secured to the spokes of an artillery steel wheel, which, by virtue of its structural rigidity, offers a substantial foundation for the drum. The means which are used to secure the drum are also used to provide better welding during the assembly of the symmetrical portions of the wheel.

Referring to the numbered parts of the accompanying drawings.

Figure 1:
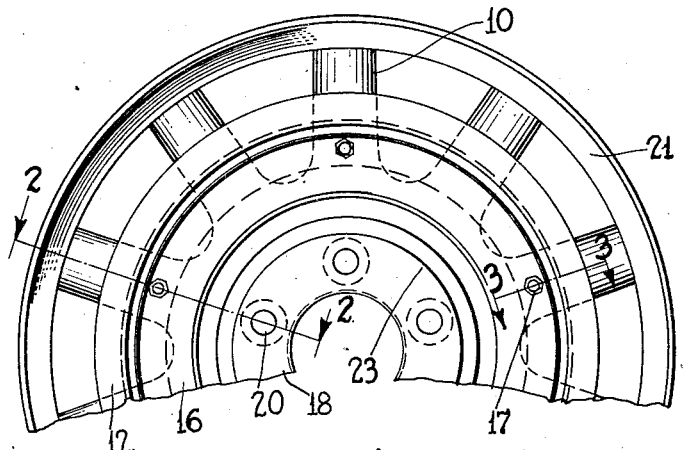
Fig. 1 is a side elevation of the assembled wheel and brake drum taken from the back or brake drum side of the wheel.
Figures 2, 3:
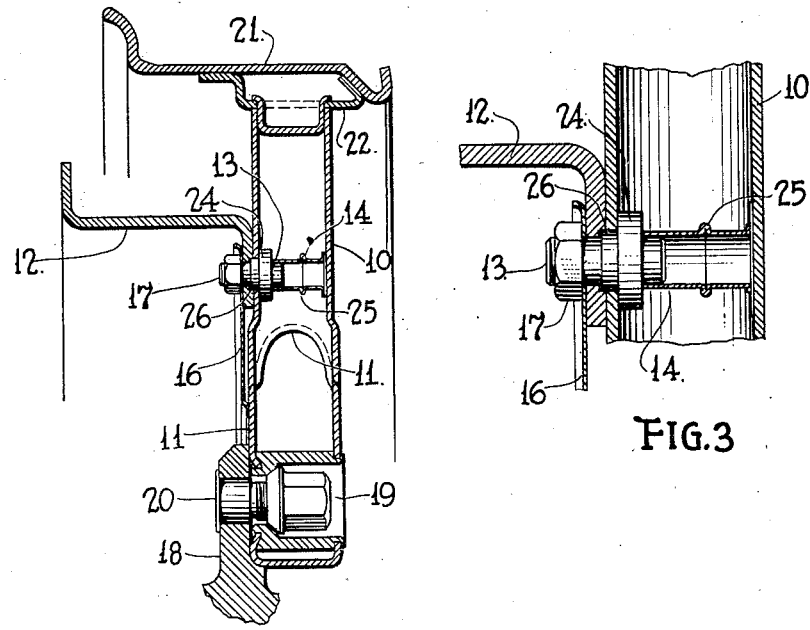
Fig. 2 is a view of a section taken on line 2—2 of Fig. 1, showing a portion of the wheel hub flange.
Fig. 3 is an enlarged view of a section taken on line 3—3 of Fig. 1, showing the drum and spoke connection in detail.

In the drawings, the spoke 10, which is one of a series of similar radially extending members, is shown in cross section, with the outer end thereof attached to a rim 21 and felloe 22 of modern design. The spoke and rim attachment, however, form no part of my invention, and are merely shown to further illustrate the practical aspects of my invention. In this particular type of wheel, the inner ends of the spokes terminate in a continuous annular body portion. This portion pilots on the wheel hub 18, to which it is demountably secured by the studs 20 and cap nuts 19. The dotted line showing of the nave portion 11 of the artillery wheel spider 23 in Figure 2, illustrates the cross sectional contour of the section intermediate of the spokes.

A stud 13 is spot or tack welded to the inner half of the artillery wheel spoke before the assembly of the two half portions previously mentioned, and is retained within the spoke by virtue of the large annular shoulder 24, the diameter of which is larger than the hole in the spoke through which the outer threaded end of the stud extends.

A brake drum 12 is piloted on the enlarged portions of the studs 13, which engage corresponding diametrical openings 26 of the drum, centrally positioning it in relation to the wheel body. The drum is detachably mounted by a series of securing nuts 17, which also engage a dust shield 16, holding it firmly against the brake drum and the body portion of the wheel. The dust shield 16 is provided to protect the braking surface and mechanism from dirt and moisture, which ordinarily would enter through the section between the inner periphery of the brake drum 12 and the inner periphery 11 of the wheel. The inner end of the stud, or more specifically, the end within the spoke, serves as a pilot for a tubular spacer 14, and fits telescopically within said spacer. In the assembly of the two half portions of the wheel spider, these spacers are placed in their respective positions and circular insulating pads 15 are inserted between the spacer ends and the outer half of the spider before the welding operation takes place. The outer ends of the spacers are flanged outwardly to provide seats for the pads. These spacers are of light tubular construction and crush at 25 to a certain degree upon the application of pressure in the welding of the spoke halves. The use of these spacers greatly facilitates the assembly of the spiders by virtue of their crushable tendency.

By virtue of the rigid wheel, I am able to bolt the brake drum directly to the spokes, hence I am able to utilize a drum with a relatively short inward flange. Consequently, the drum can be formed from a rolled section of strip steel.

As the usual manner of making drums constitutes pressing them from a steel plate, it is clearly seen that an appreciable amount is saved in weight, material and manufacturing cost. Inasmuch as the rolled section can be coiled to form the drum, high carbon steel can be used which can be coiled cold, thus constituting a direct advantage over the heating operation required for drawing a drum from a plate.

In addition to the aforementioned advantage of the possibility of using an inexpensive brake drum construction, I have provided improved welding conditions by the use of the tubular spacers. Thus by common means I have attained a dual result, which may be understood by anyone skilled in the art, to constitute a distinctly advantageous construction.

It is desired that the appended claims be read with a breadth commensurate with the generic spirit of my invention.

What I claim is:

1. An article of manufacture comprising a spider including a plurality of concave legs formed as complemental radially extending spoke halves, studs arranged in abutting relationship with a concave portion of certain of said legs and integrally united therewith, tubular members arranged to telescopically fit on said studs, and together with said studs, properly space the complemental concave spoke halves apart in the assembly of the complemental portions in the manufacture of a wheel.

2. An article of manufacture comprising a spider including a plurality of concave legs formed as complemental radially extending spoke halves, tubular members within said legs, a brake drum, flanged studs arranged in abutting relationship with a concave portion of certain of said legs, and attached thereto, a reduced diametrical section upon the inner end of said studs adapted to telescopically fit within said tubular members, and a reduced diametrical section on the outer end of said studs to project through an concentrically position said drum in relation to said spider.

In testimony whereof I hereunto affix my signature.

CAROLUS L. EKSERGIAN.